United States Patent
Xu et al.

(10) Patent No.: US 10,491,912 B1
(45) Date of Patent: Nov. 26, 2019

(54) METHOD AND APPARATUS FOR VIDEO CODING

(71) Applicant: Tencent America LLC, Palo Alto, CA (US)

(72) Inventors: Xiaozhong Xu, State College, PA (US); Shan Liu, San Jose, CA (US); Meng Xu, San Jose, CA (US); Xiang Li, Los Gatos, CA (US); Stephan Wenger, Hillsborough, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/226,195

(22) Filed: Dec. 19, 2018

Related U.S. Application Data

(60) Provisional application No. 62/695,487, filed on Jul. 9, 2018.

(51) Int. Cl.
*H04N 19/423* (2014.01)
*H04N 19/172* (2014.01)
*H04N 19/513* (2014.01)
*H04N 19/139* (2014.01)
*H04N 19/44* (2014.01)
*H04N 19/132* (2014.01)

(52) U.S. Cl.
CPC ......... *H04N 19/423* (2014.11); *H04N 19/132* (2014.11); *H04N 19/139* (2014.11); *H04N 19/172* (2014.11); *H04N 19/44* (2014.11); *H04N 19/513* (2014.11)

(58) Field of Classification Search
CPC .... H04N 19/423; H04N 19/132; H04N 19/44; H04N 19/172; H04N 19/513; H04N 19/139
USPC ..................................... 375/240.26
See application file for complete search history.

(56) References Cited

U.S. PATENT DOCUMENTS

| | | | |
|---|---|---|---|
| 2007/0098068 A1* | 5/2007 | Kimata | H04N 19/105 375/240.12 |
| 2014/0253681 A1* | 9/2014 | Zhang | H04N 19/597 348/43 |
| 2017/0372494 A1* | 12/2017 | Zhu | G06T 9/00 |

* cited by examiner

*Primary Examiner* — Jared Walker
(74) *Attorney, Agent, or Firm* — Oblon, McClelland, Maier & Neustadt, L.L.P.

(57) ABSTRACT

Aspects of the disclosure provide method and apparatus for video coding. In some examples, an apparatus includes processing circuitry. The processing circuitry decodes a first portion of video data to obtain first data of a first reconstructed picture, the first data including a first data set that corresponds to a first information category and a second data set that corresponds to a second information category. The processing circuitry determines whether to store at least one of the first data set and the second data set as reference data, and stores the at least one of the first data set and the second data set of the first reconstructed picture as the reference data based on the determination. The processing circuitry also decodes a second portion of the video data to obtain second data of a second reconstructed picture based on the stored reference data.

20 Claims, 13 Drawing Sheets

METHOD AND APPARATUS FOR VIDEO CODING

INCORPORATION BY REFERENCE

This present disclosure claims the benefit of priority to U.S. Provisional Application No. 62/695,487, "CLASS-BASED REFERENCE PICTURE MEMORY" filed on Jul. 9, 2018, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 1, a current block (101) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (102 through 106, respectively). In H.265, the MV prediction can use predictors from the same reference picture that the neighboring block is using.

SUMMARY

Aspects of the disclosure provide methods and apparatuses for video coding. In some examples, an apparatus includes processing circuitry that decodes a first portion of video data to obtain first data of a first reconstructed picture, the first data including a first data set that corresponds to a first information category and a second data set that corresponds to a second information category, and the first data set and the second data set being mutually exclusive. The processing circuitry determines whether to store at least one of the first data set and the second data set of the first reconstructed picture as reference data, and stores the at least one of the first data set and the second data set of the first reconstructed picture as the reference data based on the determination. The processing circuitry also decodes a second portion of the video data to obtain second data of a second reconstructed picture based on the stored reference data.

In some examples, the processing circuitry determines whether to store the at least one of the first data set and the second data set of the first reconstructed picture as the reference data based on control information provided in the first portion of the video data.

In some examples, in response to determining to store at least the first data set as the reference data, the processing circuitry stores the first data set in a first memory space configured to store data sets of a first plurality of reconstructed pictures that correspond to the first information category; and, in response to determining to store at least the second data set as the reference data, the processing circuitry stores the second data set in a second memory space configured to store data sets of a second plurality of reconstructed pictures that correspond to the second information category.

In some examples, in a case that the first data set is stored in the first memory space and the second data set is stored in the second memory space, in response to an instruction to perform an operation on the stored first data set, the processing circuitry performs the operation on both of the stored first data set stored and the stored second data set. In some examples, the operation is a data deletion operation.

In some examples, the first memory space is configured to store at most M data sets of M most recently reconstructed pictures that correspond to the first information category, and the second memory space is configured to store at most N data sets of N most recently reconstructed pictures that correspond to the second information category. In some examples, in response to determining to store at least the first data set as the reference data, the processing circuitry deletes from the first memory space a third data set of a third reconstructed picture that is not one of the M most recently reconstructed pictures upon obtaining the first data of the first reconstructed picture; and, in response to determining to store at least the second data set as the reference data, the processing circuitry deletes from the second memory space a fourth data set of a fourth reconstructed picture that is not one of the N most recently reconstructed pictures upon obtaining the first data of the first reconstructed picture. In some examples, M ranges from 1 to 10, and N ranges from 1 to M.

In some examples, in response to determining to store at least the first data set as the reference data, the processing circuitry determines whether the first memory space includes a third data set of a third reconstructed picture, a difference in a Picture Order Count (POC) number of the third reconstructed picture and a POC number of the first reconstructed picture being greater than a first threshold, and deletes from the first memory space the third data set of the third reconstructed picture in response to determining the first memory space includes the third data set. In some examples, in response to determining to store at least the second data set as the reference data, the processing circuitry determines whether the second memory space includes a fourth data set of a fourth reconstructed picture, a difference in a POC number of the fourth reconstructed picture and the POC number of the first reconstructed picture being greater than a second threshold, and deletes from the second memory space the fourth data set of the fourth reconstructed picture in response to determining the second memory space includes the fourth data set.

In some other examples, in response to determining to store at least the first data set as the reference data, the processing circuitry determines whether the first memory space includes a third data set of a third reconstructed picture, the third reconstructed picture and the first reconstructed picture being in a same temporal layer, and deletes from the first memory space the third data set of the third reconstructed picture in response to determining the first memory space includes the third data set. In some other examples, in response to determining to store at least the second data set as the reference data, the processing circuitry determines whether the second memory space includes a fourth data set of a fourth reconstructed picture, the fourth reconstructed picture and the first reconstructed picture being in the same temporal layer, and deletes from the second memory space the fourth data set of the fourth reconstructed picture in response to determining the second memory space includes the fourth data set.

In some examples, in a case that the first data set and the second data set are stored as the reference data, in response to an instruction to perform an operation on the stored first data set, the processing circuitry performs the operation on both of the stored first data set and the stored second data set.

In some examples, the first information category corresponds to sample information, and the second information category corresponds to motion information. In some examples, the first information category and the second information category correspond to mutually exclusive subsets selected from one or more of: sample data of various color components, motion vectors, temporal prediction directions, reference indices, intra prediction modes, block sizes, and block structures.

Aspects of the disclosure also provide a non-transitory computer-readable medium storing instructions which when executed by a computer for video decoding cause the computer to perform the method for video coding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
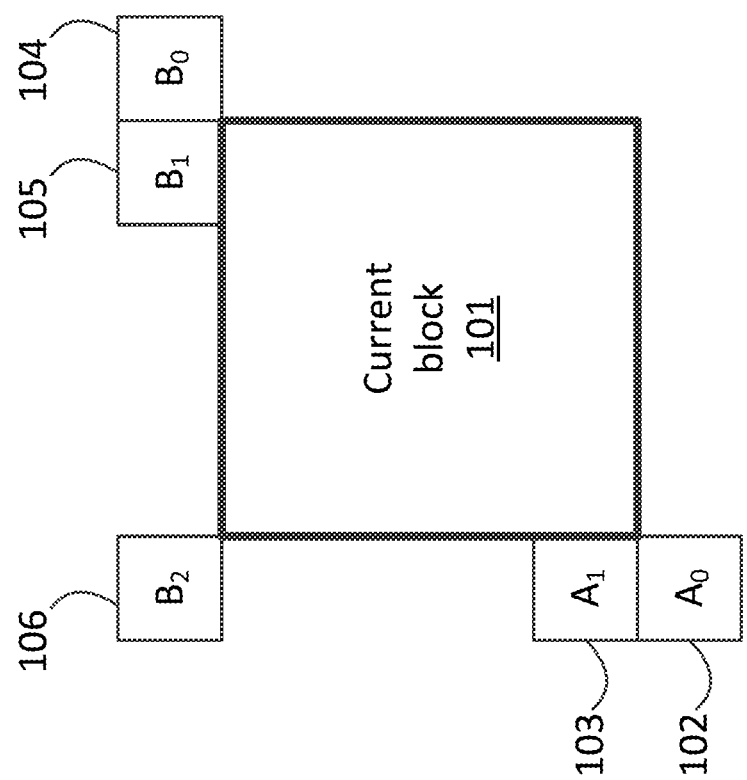
FIG. 1 is a schematic illustration of a current block and its surrounding spatial merge candidates in one example.
Figure 2:
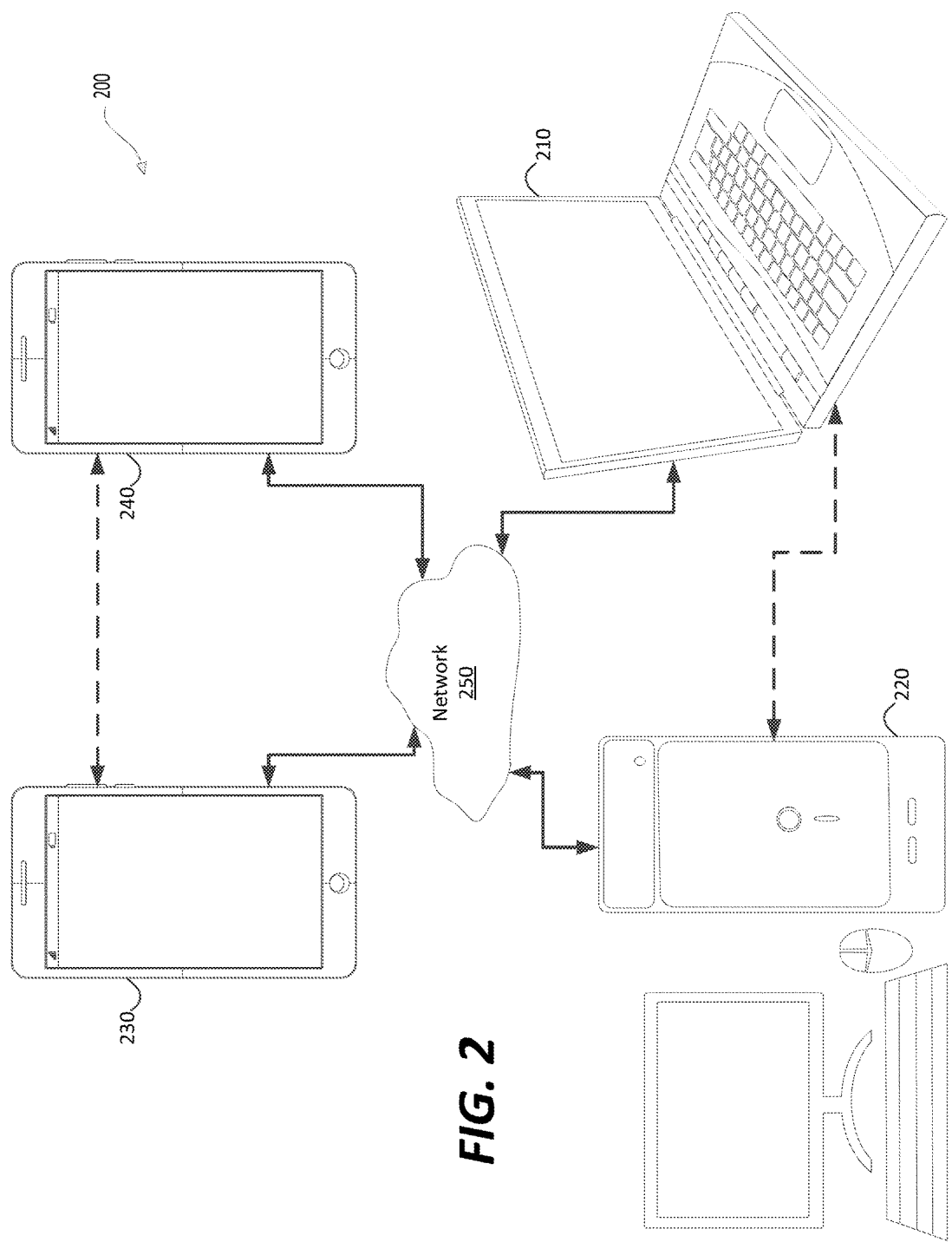
FIG. 2 is a schematic illustration of a simplified block diagram of a communication system (200) in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers, and smart phones, but the principles of the present disclosure may be not so limited. Embodiments of the present disclosure find application with laptop computers, tablet computers, media players, and/or dedicated video conferencing equipment. The network (250) represents any number of networks that convey coded video data among the terminal devices (210), (220), (230), and (240), including for example wireline (wired) and/or wireless communication networks. The communication network (250) may exchange data in circuit-switched and/or packet-switched channels. Representative networks include telecommunications networks, local area networks, wide area networks, and/or the Internet. For the purposes of the present discussion, the architecture and topology of the network (250) may be immaterial to the operation of the present disclosure unless explained herein below.

Figure 3:
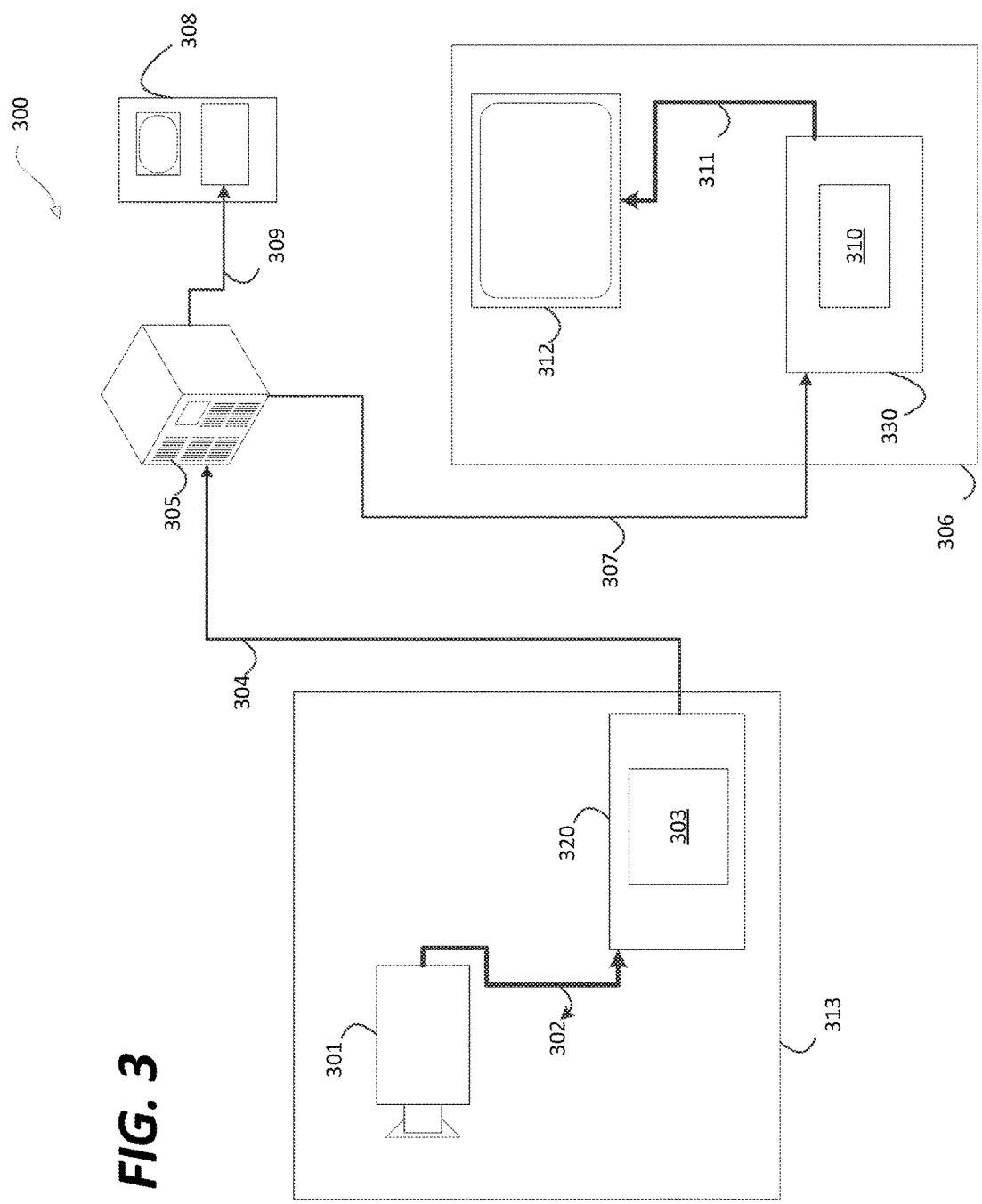
FIG. 3 is a schematic illustration of a simplified block diagram of a communication system (300) in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
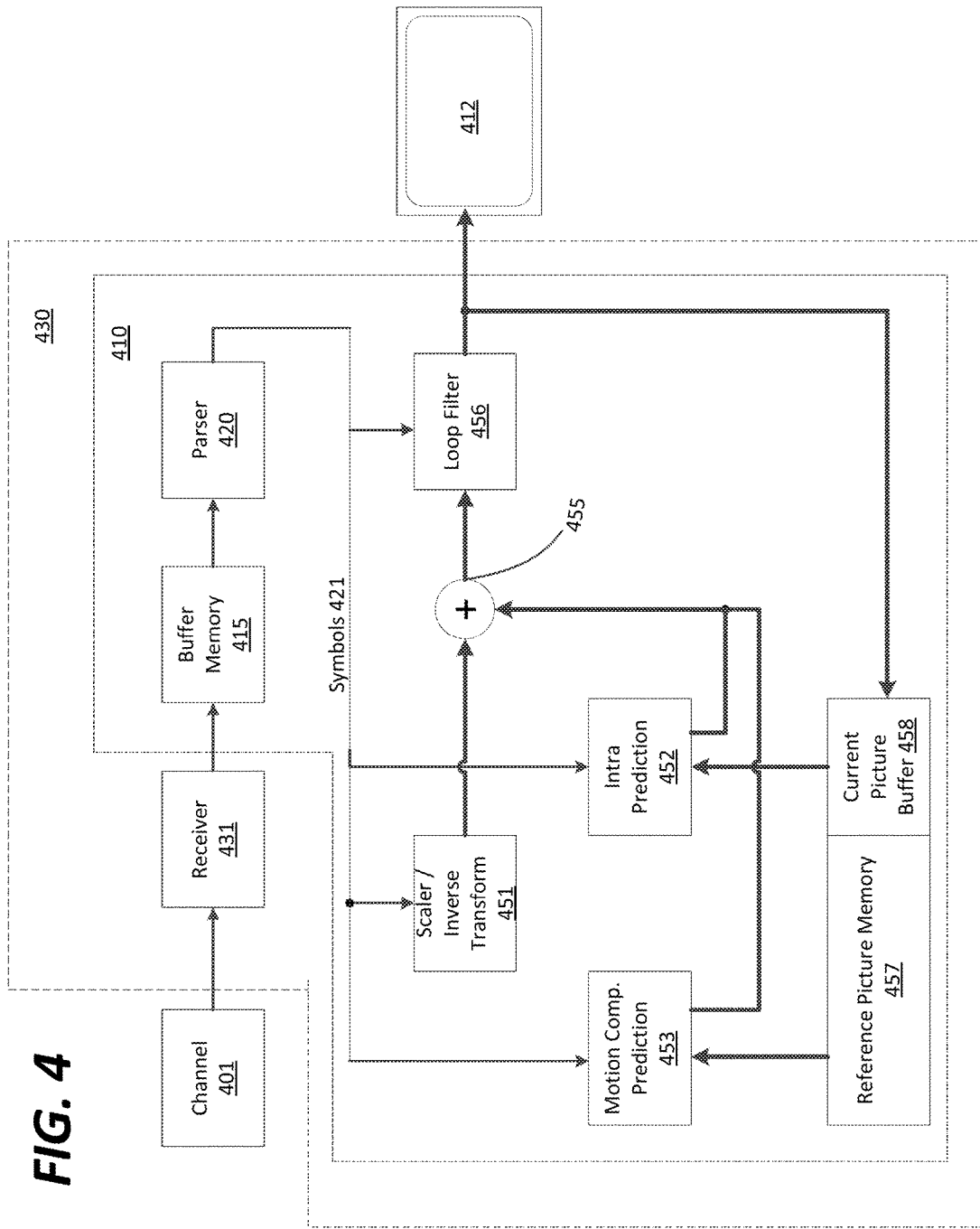
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs), and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
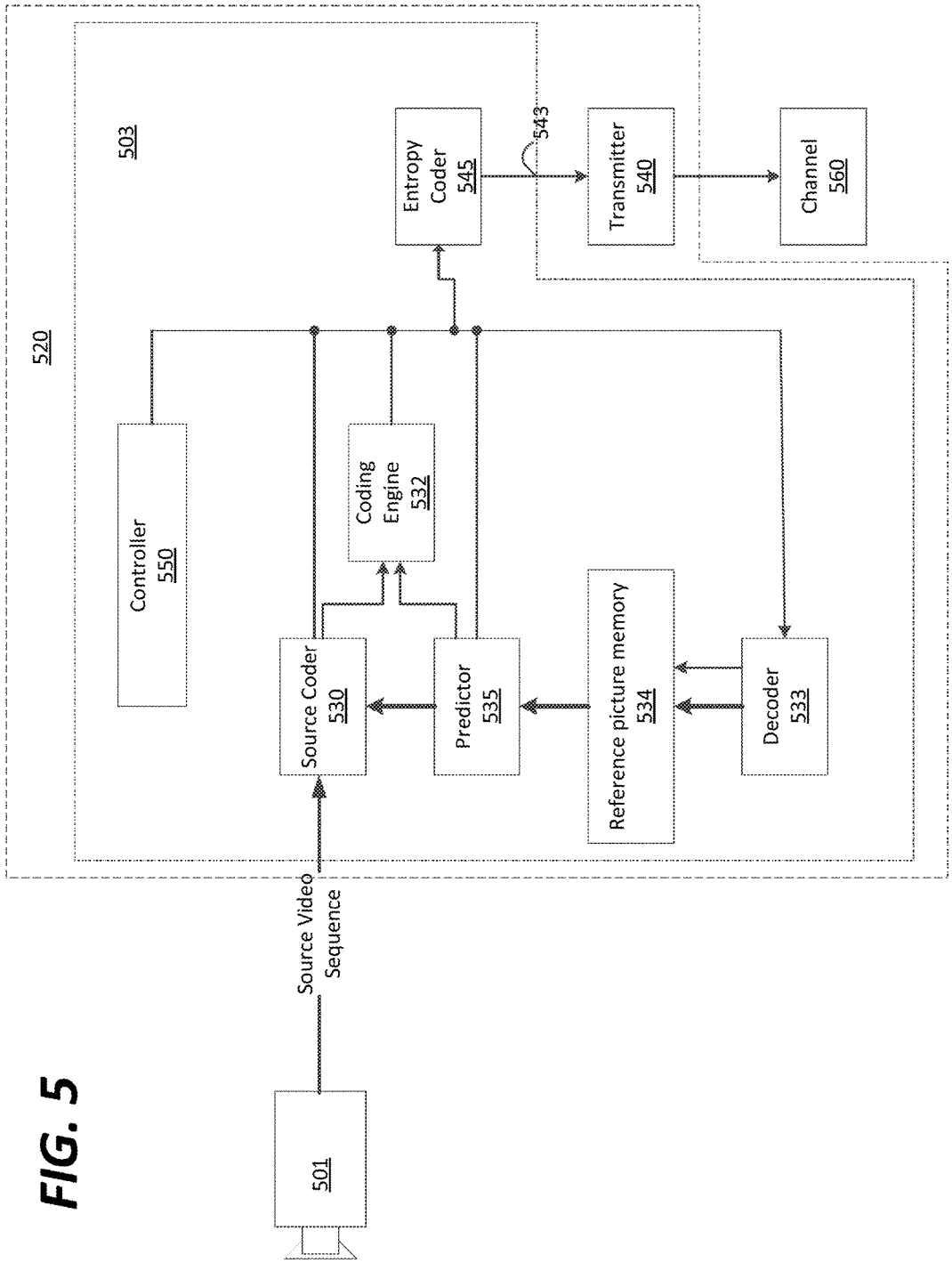
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415), and parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously-coded picture from the video sequence that were designated as "reference pictures". In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block structures, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by lossless compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
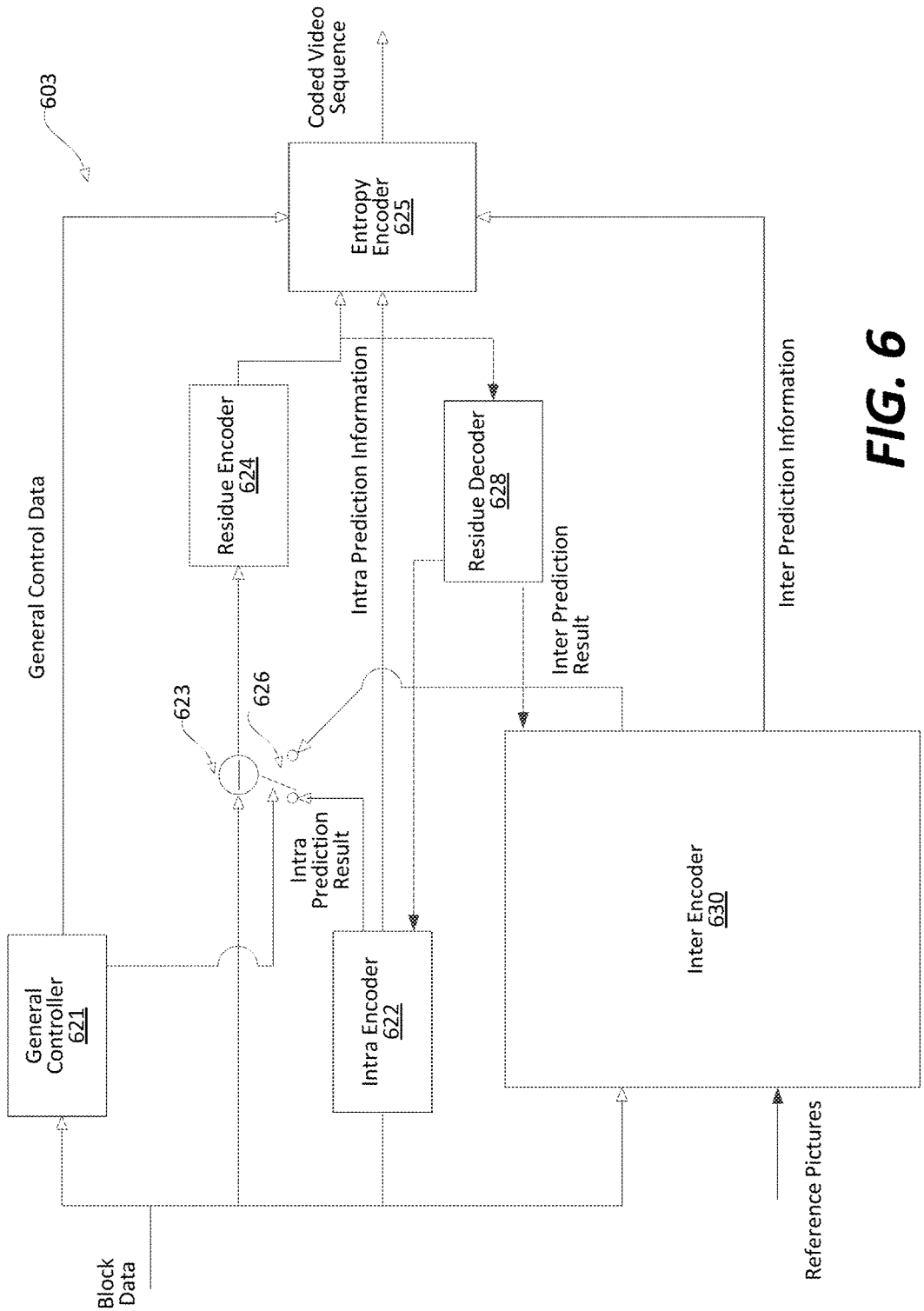
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
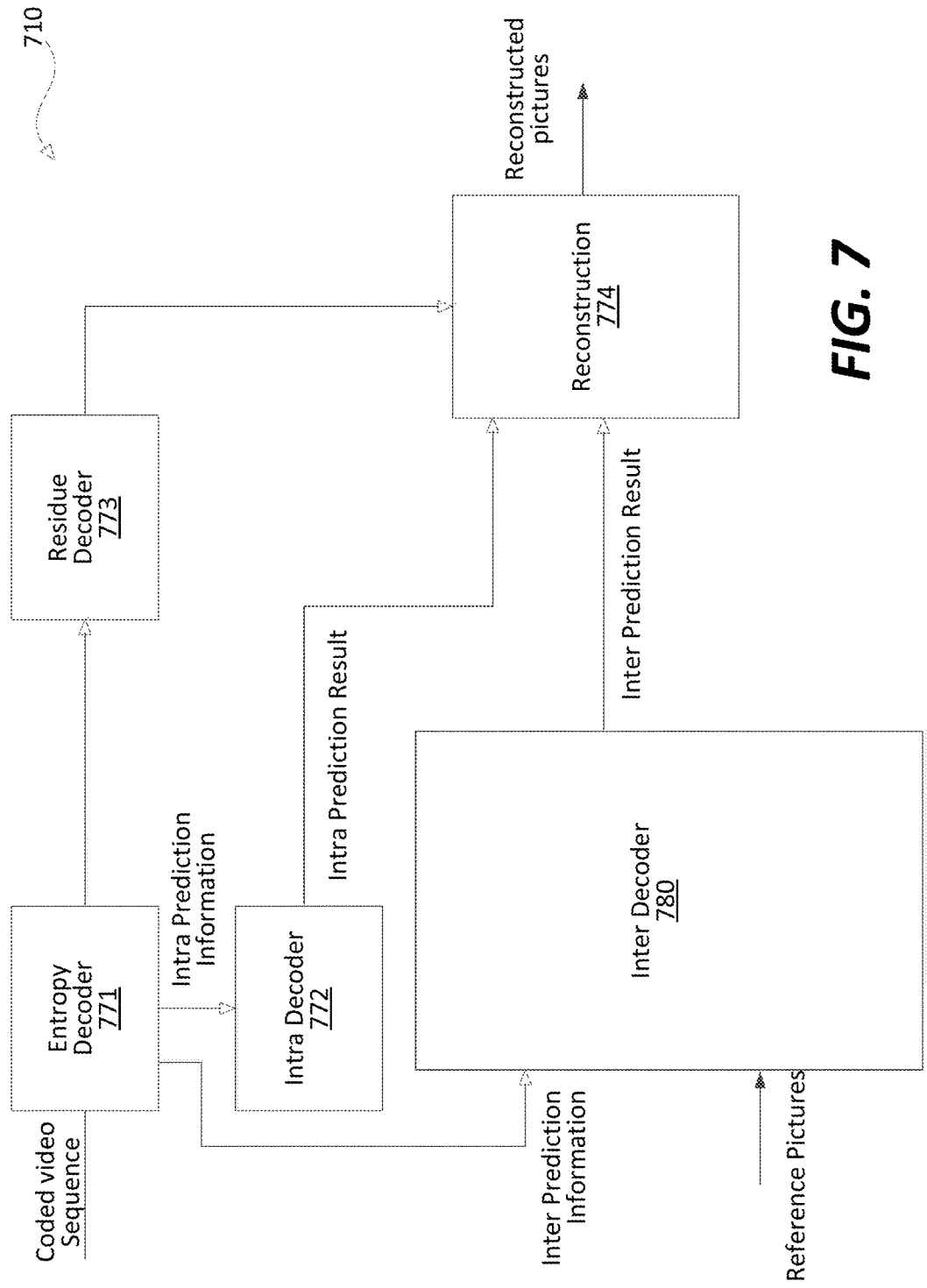
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (503), and the video decoders (310), (410), and (710) can be implemented using one or more processors that execute software instructions.

Figure 8:
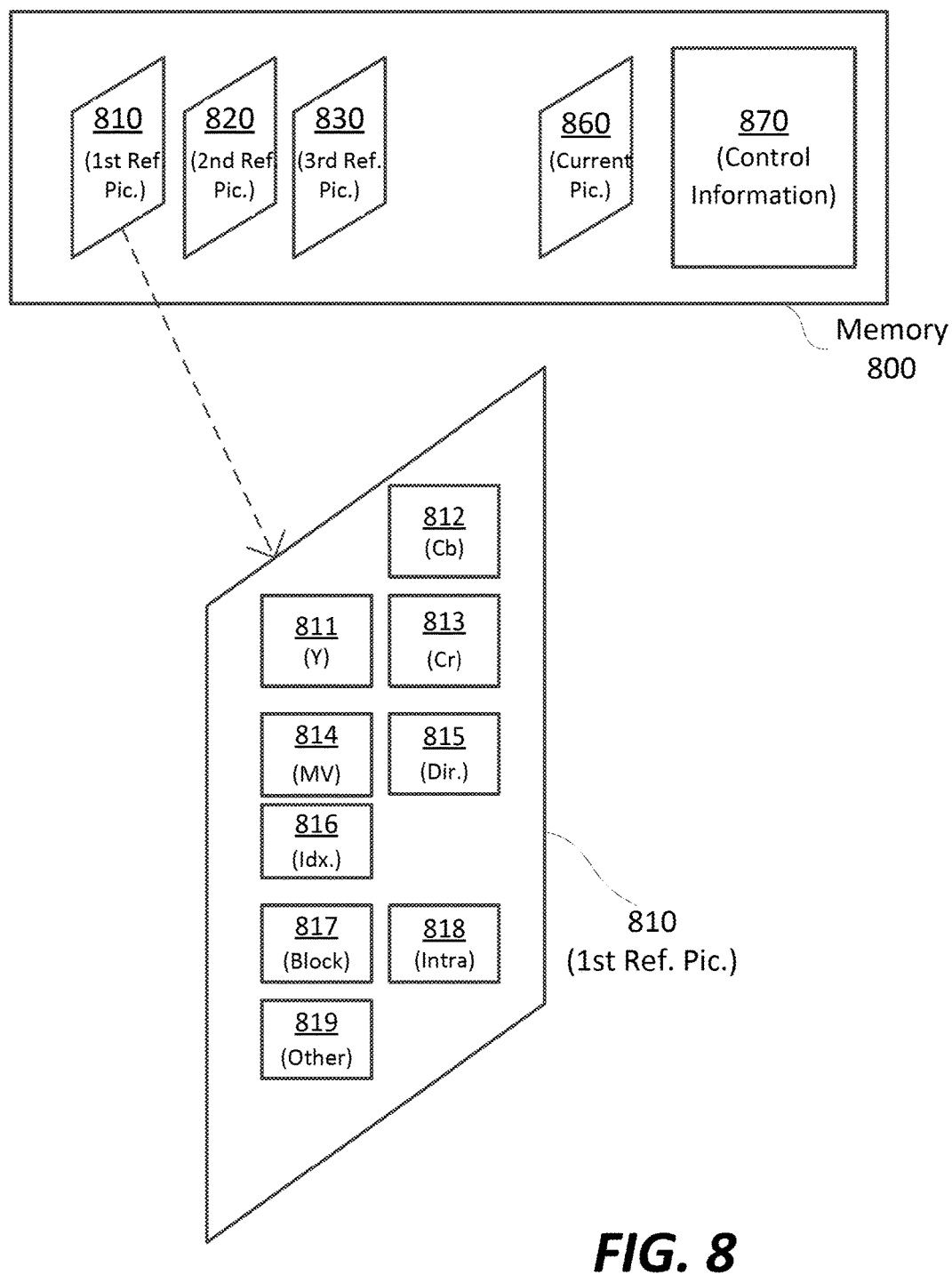
FIG. 8 shows a memory layout for storing information in a decoder or an encoder in accordance with one embodiment.

FIG. 8 shows a memory layout for storing information in a decoder or an encoder in accordance with one embodiment. In FIG. 8, during a decoding process or an encoding process, various information can be stored in allocated memory spaces in a memory (800). In some embodiments, the memory (800) can include memory spaces (810), (820), and (830) that respectively store data corresponding to a plurality of reference pictures, a memory space (860) that stores data corresponding to a picture currently being reconstructed (or also referred to as the "current picture"), and a memory space (870) that stores control information. There can be other memory spaces in the memory (800) that are allocated for other purposes. In some examples, some of the memory spaces depicted in FIG. 8 may be omitted. In some embodiments, the memory (800) may be implemented using one or a combination of volatile and non-volatile storage devices.

The memory space (810) may be divided into smaller memory spaces, including subdivided memory spaces (811), (812), and (813) that store multiple planes of sample data of different color components, such as Y, Cb, and Cr, respectively. The subdivided memory spaces (811), (812), and (813) may be collectively recognized as a memory space for storing sample information. The memory space (810) may include a subdivided memory space (814) that stores motion vectors, a subdivided memory space (815) that stores prediction direction information indicating a temporal direction of an applicable reference picture, and a subdivided memory space (816) that stores reference index information identifying the applicable reference picture in a list corresponding to the temporal direction. The subdivided memory spaces (814), (815), and (816) may be collectively recognized as a memory space for storing motion information (or "motion field information").

The memory space (810) may further include subdivided memory spaces for storing other categories of data. For example, the memory space (810) may include a subdivided memory space (817) that stores block structures, a subdivided memory space (818) that stores intra prediction modes, and a subdivided memory space (819) that stores other information.

In some embodiments, there are other subdivided memory spaces in the memory space (810) that are allocated for other purposes, or some of the subdivided memory spaces depicted in FIG. 8 may be omitted. Also, the memory space (810) depicted in FIG. 8 shows an exemplary memory allocation for storing data corresponding to a reconstructed picture. In some examples, the memory spaces (820), (830), and (860) may have an arrangement that is similar to the memory space (810).

In operation, when a current picture is fully reconstructed and stored in the memory space (860), the decoder or the encoder can determine whether data corresponding to the currently reconstructed picture is to be stored as reference data for a subsequent decoding or encoding process. When the decoder or the encoder determines to store the data corresponding to the currently reconstructed picture, the decoder or the encoder can further identify an available memory space among memory spaces (810), (820), and (830) for storing data corresponding to reference pictures, and copy the content in the memory space (860) to the identified available memory space. In some examples, the copying process can be implemented by updating electrical or magnetic characteristics of the memory cells that constitute the identified memory space, or updating pointers or other memory references that are directed to the memory cells of the memory space (860) to be redefined as one of the memory spaces (810), (820), and (830) without actually moving the contents stored therein.

In some coding technologies or standards, adding a newly reconstructed picture to a pool of reference data may also cause removal of at least one previously stored reference picture from the pool of reference data. In some examples, control information regarding which previously stored reference picture in the pool of reference data is to be removed is included in the encoded video data. Therefore, in some decoders, the decoding of a current picture can include obtaining the control information that denotes a previously stored reference picture to be removed. In some examples, which previously stored reference picture in the pool of reference data is to be removed can be determined according to a set rules as defined in a particular video coding standard for encoding or decoding the video data.

Figure 9A:
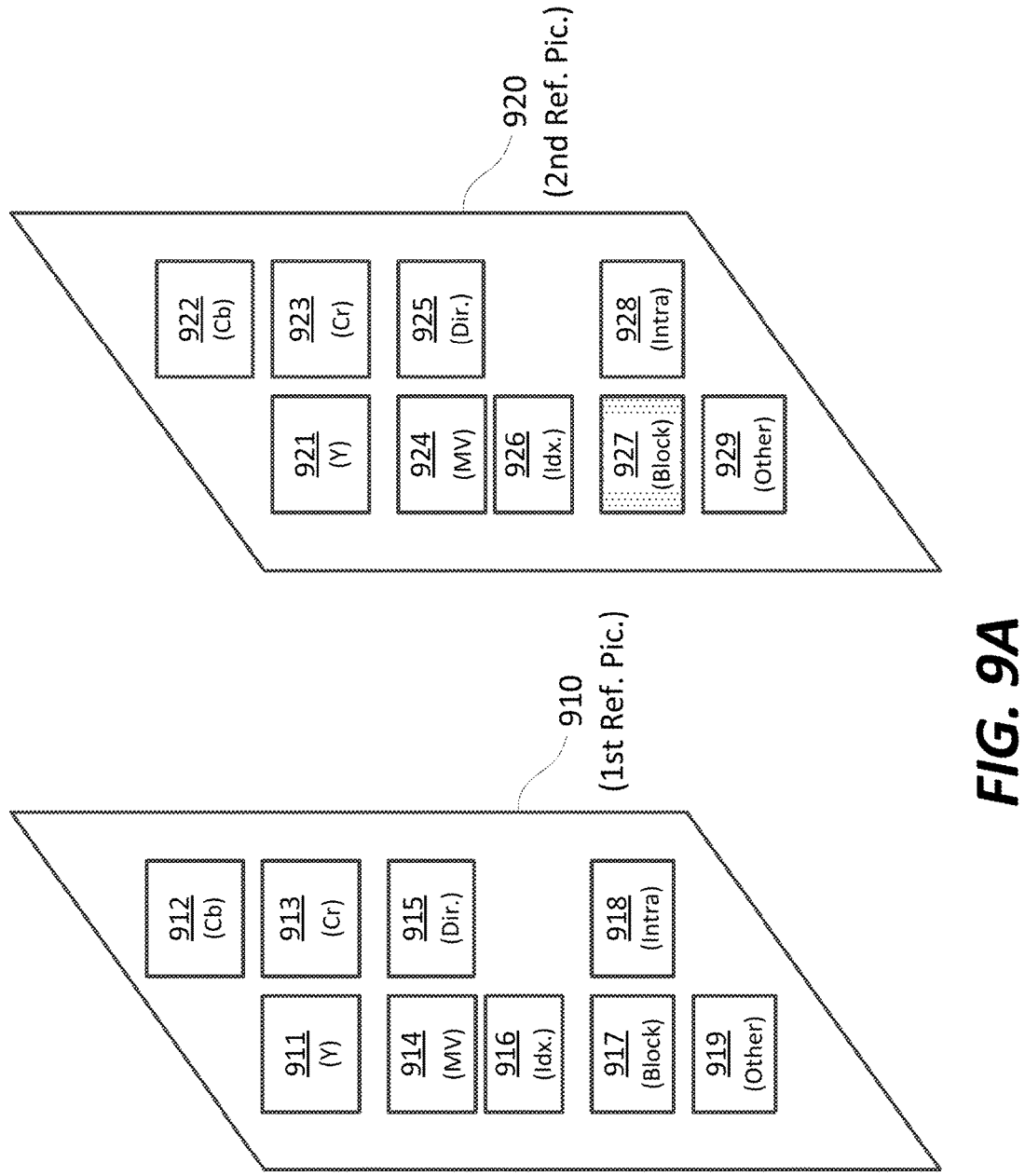
FIG. 9A shows a memory layout for storing information in a decoder or an encoder in accordance with another embodiment.

FIG. 9A shows a memory layout for storing information in a decoder or an encoder in accordance with another embodiment. In FIG. 9A, a memory for storing reference data may include a memory space (910) for storing data corresponding to a first reference picture and a memory space (920) for storing data corresponding to a second reference picture.

The memory space (910) may include various subdivided memory spaces for storing data sets corresponding to respective types of information. For example, the memory space (910) may have a configuration similar to the memory space (810) and can include subdivided memory spaces (911), (912), and (913) that store sample data of different color components, such as Y, Cb, and Cr, respectively; a subdivided memory space (914) that stores motion vectors; a subdivided memory space (915) that stores prediction direction information indicating a temporal direction of an applicable reference picture; a subdivided memory space (916) that stores reference index information identifying the applicable reference picture in a list corresponding to the temporal direction; a subdivided memory space (917) that stores block structures; a subdivided memory space (918) that stores intra prediction modes; and a subdivided memory space (919) that stores other information.

Also, the memory space (920) may have a configuration similar to the memory space (810) and include various subdivided memory spaces for storing data sets corresponding to respective types of information. For example, the memory space (920) can include subdivided memory spaces (921), (922), and (923) that store sample data of different color components, such as Y, Cb, and Cr, respectively; a subdivided memory space (924) that stores motion vectors; a subdivided memory space (925) that stores prediction direction information indicating a temporal direction of an applicable reference picture; a subdivided memory space (926) that stores reference index information identifying the applicable reference picture in a list corresponding to the temporal direction; a subdivided memory space (928) that stores intra prediction modes; and a subdivided memory space (929) that stores other information.

In the example shown in FIG. 9A, information regarding block structures can be managed as a separate information category. Compared with the memory space (910), in some examples, the memory space (920) does not have a subdivided memory space (927) for storing block structures, which would have been a counterpart of the subdivided memory space (917) in the memory space (910). In some alternative examples, the memory space (920) has the subdivided memory space (927) for storing block structures, but does not use the subdivided memory space (927) to store valid block structure information.

In some examples, other classifications of data sets into different information categories can be implemented or defined in a video standard in view of the present disclosure and are within the scope of the present disclosure.

In some embodiments, for managing the stored data corresponding to the first and second reference pictures in the memory space (910) and the memory space (920), data sets can be arranged into different information categories corresponding to mutually exclusive subsets selected from one or more of: sample data of various color components, motion vectors, temporal prediction directions, reference indices, intra prediction modes, block sizes, block structures, and the like. In some examples, the data of reference pictures can be divided into three information categories: sample information, stored in subdivided memory spaces (911), (912), (913), (921), (922), and (923); motion information, stored in subdivided memory spaces (914), (915), (916), (924), (925), and (926); and other metadata, stored in subdivided memory spaces (917), (918), (919), (927), (928), and (929).

Accordingly, in some embodiments, the reference data does not have to be accessed in units of pictures, but in units of data sets of various information categories. All data sets of a particular reference picture can be identified according to properly assigned addresses of the memory spaces for storing the data sets of the picture, or using a unifying property of the picture, such as an assigned Picture Order Count (POC), or an equivalent index denoting an instant in a decoding process.

In the example as shown in FIG. 9A, an encoder may have decided that the memory overhead for storing the block structure information (as indicated by the shaded memory space 927) for the second reference picture, from an overall memory usage viewpoint or from a coding efficiency viewpoint, or the like, justifies excluding the block structure information from being stored as part of the pool of reference data. In some examples, the encoder can perform such evaluation based on an estimated amount of memory, capability, and the like, of a compliant decoder and balancing between using more but partially stored reference pictures and using fewer but completely stored reference pictures.

Figure 9B:
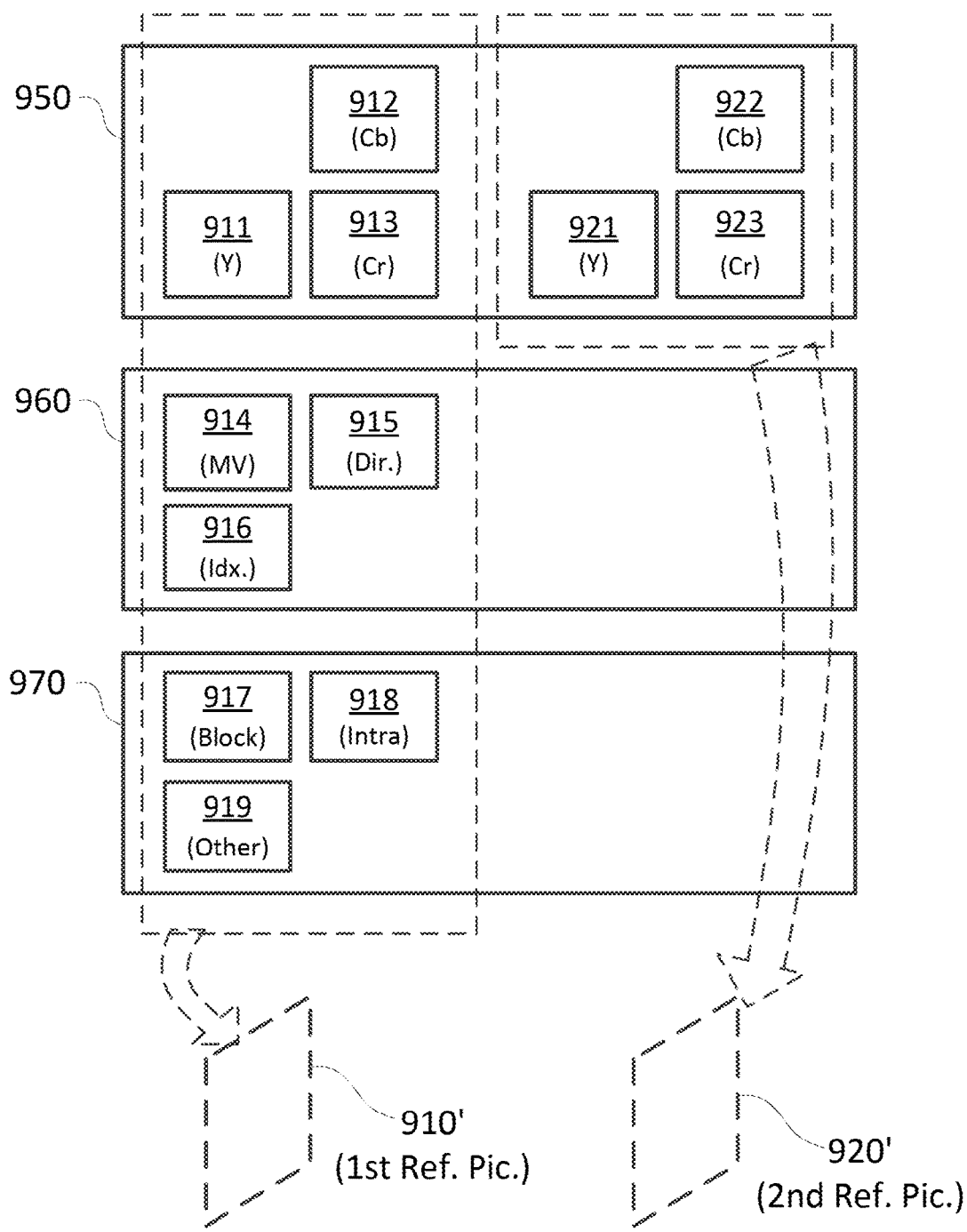
FIG. 9B shows a memory layout for storing information in a decoder or an encoder in accordance with another embodiment.

FIG. 9B shows a memory layout of storing information in a decoder or an encoder in accordance with another embodiment. Components that are the same or similar to those in FIG. 9A are given the same reference numbers, and description thereof is thus simplified or omitted.

In FIG. 9B, a memory for storing reference data may include a memory space (950) configured to store data sets of a first plurality of reconstructed pictures that correspond to a first information category, such as sample information of the pictures; a memory space (960) configured to store data sets of a second plurality of reconstructed pictures that correspond to a second information category, such as motion information of the pictures; and a memory space (970) configured to store data sets of a third plurality of reconstructed pictures that correspond to a third information category, such as other metadata of the pictures. In some examples, if an encoder or a decoder determines that a certain information category is not to be stored, allocation or access to the memory space corresponding to such omitted information category can be omitted.

In the example shown in FIG. 9B, data of a first reconstructed picture can be managed as stored in a first virtual memory space (910') that corresponds to memory space (910) in FIG. 9A; and data of a second reconstructed picture can be managed as stored in a second virtual memory space (920') that corresponds to memory space (920) in FIG. 9A. In this example, the sample information of the first reconstructed picture is stored in subdivided memory spaces (911), (912), and (913) in the memory space (950); the motion information of the first reconstructed picture is stored in subdivided memory spaces (914), (915), and (916) in the memory space (960); and the other metadata of the first reconstructed picture is stored in subdivided memory spaces (917), (918), and (919) in the memory space (970). In contrast, for the second reconstructed picture, only the sample information of the second reconstructed picture is stored, and in subdivided memory spaces (921), (922), and (923) in the memory space (950). The motion information of the second reconstructed picture and the other metadata of the second reconstructed picture are not stored in the memory spaces (960) and (970).

In some embodiments, the memory space (950) is configured to store at most M data sets of M reconstructed pictures that correspond to the first information category. In some embodiments, the memory space (960) is configured to store at most N data sets of N reconstructed pictures that correspond to the second information category. Also, in some embodiments, the memory space (970) is configured to store at most O data sets of O reconstructed pictures that correspond to the third information category. In some examples, M, N, O are positive integers, where M can range from 1 to 10, N can range from 1 to M, and O can range from 1 to M. In some examples, if an encoder or a decoder determines that a certain information category is not stored, the memory space corresponding to such omitted information category can be omitted as well, and the corresponding M, N, or O can be set to O.

In some examples, storing various data sets of reconstructed pictures is performed in a first-in-first-out approach with fixed queue lengths for each information category. This is based on a theory that older reference sample data may still be useful for operations other than decoding a next picture, such as a background restoration process, whereas older motion information may more likely be stale and useless. Therefore, the memory space (950) can store data sets of M most recently reconstructed pictures; the memory space (960) can store data sets of N most recently reconstructed pictures; and the memory space (970) can store data sets of O most recently reconstructed pictures. In at least one example, the memory space (970) can be omitted, M can be set to five (5), and N can be set to three (3). In such an example, the sample information of the five most recently reconstructed pictures are stored in the memory space (950) as the reference sample data, and motion information of only the three most recently reconstructed pictures are stored in the memory space (960) as the reference motion data.

In another example, management of which data sets of one or more reconstructed pictures are stored as reference data can be controlled according to a specific reference memory management mechanism defined in a particular video coding standard, as long as the encoder and decoder apply the same reference memory management mechanism as defined in the particular video coding standard. While doing so may incur a certain coding overhead, it may still be beneficial from a coding efficiency viewpoint because, for example, more memory spaces can be allocated for storing sample information of older reference pictures while less memory spaces can be allocated for storing motion information.

In yet another example, management of which data sets of one or more reconstructed pictures are stored as reference data can be controlled by control information included in the encoded video data. For example, a syntax element may be used to indicate that a certain information category of data, such as a particular data set corresponding to motion information, may be stored as reference data when the particular data set is marked by the syntax element to be stored as the reference data.

In some embodiments, management of which data sets of one or more reconstructed pictures are stored as reference data can be controlled according to POC numbers of the reconstructed pictures.

For example, in response to determining to store a data set of a currently reconstructed picture corresponding to a first information category in the memory space (950) as the reference data, an encoder or a decoder can determine whether the memory space (950) includes a data set corresponding to the first information category of another reconstructed picture, a difference in a POC number of the other reconstructed picture and a POC number of the currently reconstructed picture being greater than a first threshold. The encoder or the decoder can then delete from the memory space (950) the data set of the other reconstructed picture in response to the determination that the memory space (950) includes the data set corresponding to the first information category of the other reconstructed picture. Similarly, for example, in response to determining to store a data set of the currently reconstructed picture corresponding to a second information category in the memory space (960) as the reference data, the encoder or the decoder can determine whether the memory space (960) includes a data set of another reconstructed picture, a difference in a POC number of the other reconstructed picture and the POC number of the currently reconstructed picture being greater than a second threshold. The encoder or the decoder can then delete from the memory space (960) the data set of the other reconstructed picture in response to determining the memory space (960) includes the data set corresponding to the second information category of the other reconstructed picture.

In some examples, the first threshold is a positive integer ranging from 1 to 16, and the second threshold is a positive integer ranging from 1 to the first threshold.

In some embodiments, management of which data sets of one or more reconstructed pictures are stored as reference data can be controlled according to temporal layer identifiers of the reconstructed pictures.

For example, in response to determining to store a data set of a currently reconstructed picture corresponding to a first information category in the memory space (950) as the reference data, an encoder or a decoder can determine whether the memory space (950) includes a data set of another reconstructed picture, the other reconstructed picture and the currently reconstructed picture being in a same temporal layer. The encoder or the decoder can then delete from the memory space (950) the data set of the other reconstructed picture in response to determining that the memory space (950) includes the other data set corresponding to the first information category. Similarly, for example, in response to determining to store a data set of the currently reconstructed picture corresponding to a second information category in the memory space (960) as the reference data, the encoder or the decoder can determine whether the memory space (960) includes a data set of another reconstructed picture, the other reconstructed picture and the currently reconstructed picture being in a same temporal layer. The encoder or the decoder can then delete from the memory space (960) the data set of the other reconstructed picture in response to determining the memory space (960) includes the other data set corresponding to the second information category.

In some embodiments, management of which data sets of which one or more reconstructed pictures are stored as reference data can be performed based on a combination of one or more of the above-noted examples.

In some implementations, even if storage requirements are not a major concern for implementing an encoder or a decoder, managing various information categories of reference data separately can still reduce the memory bandwidth usage. In some examples, if an encoder is aware that a corresponding decoder may have a memory bandwidth constraint, the encoder can indicate that a certain data set of a certain picture is not used. For example, the encoder may signal the decoder that, for decoding a current picture, no motion information from a certain reference picture is to be used. Such additional information allows the decoder to skip the fetching of the motion information, thereby saving memory bandwidth usage.

Further, the encoder may make such a decision because, during its own (for example real-time) encoding process, the encoder ran into memory bandwidth problems and therefore decided to use less memory-intensive resources, including, in some examples, the fetching of motion information from a particular reference picture. Within the constraints specified by the coding technology or standard, an encoder can be free to use whatever tool at its disposal it wishes, and that may include omitting the use of any portions of picture data, including sample information, motion information, and/or other metadata, of a particular reference picture.

In some embodiments, a hierarchy of information categories of reference data can be established. When an instruction of performing a certain memory management operation on an information category of a higher hierarchy is received, the same memory management operation instruction may be inferred as also being applicable to an information category of a lower hierarchy of a same reconstructed picture, unless, in some examples, the encoded video data includes management operation information for the information category of the lower hierarchy that overrides the inferred instruction. For example, in a case that a first data set of a reconstructed picture corresponding to a first information category is stored in a first memory space and a second data set of the reconstructed picture corresponding to a second information category is stored in a second memory space, in response to an instruction to perform an operation, such as a data deletion operation, on the stored first data set without an explicit override included in the video data, the same operation will be performed on both of the stored first data set in the first memory space and the stored second data set in the second memory space. This example is based on an observation that, when all sample data (which could be the highest hierarchy) of a particular picture is not stored as reference data, motion information and/or other metadata of the particular picture is likely not needed as reference data, unless there is an explicit control information to override such a presumption.

Figure 10:
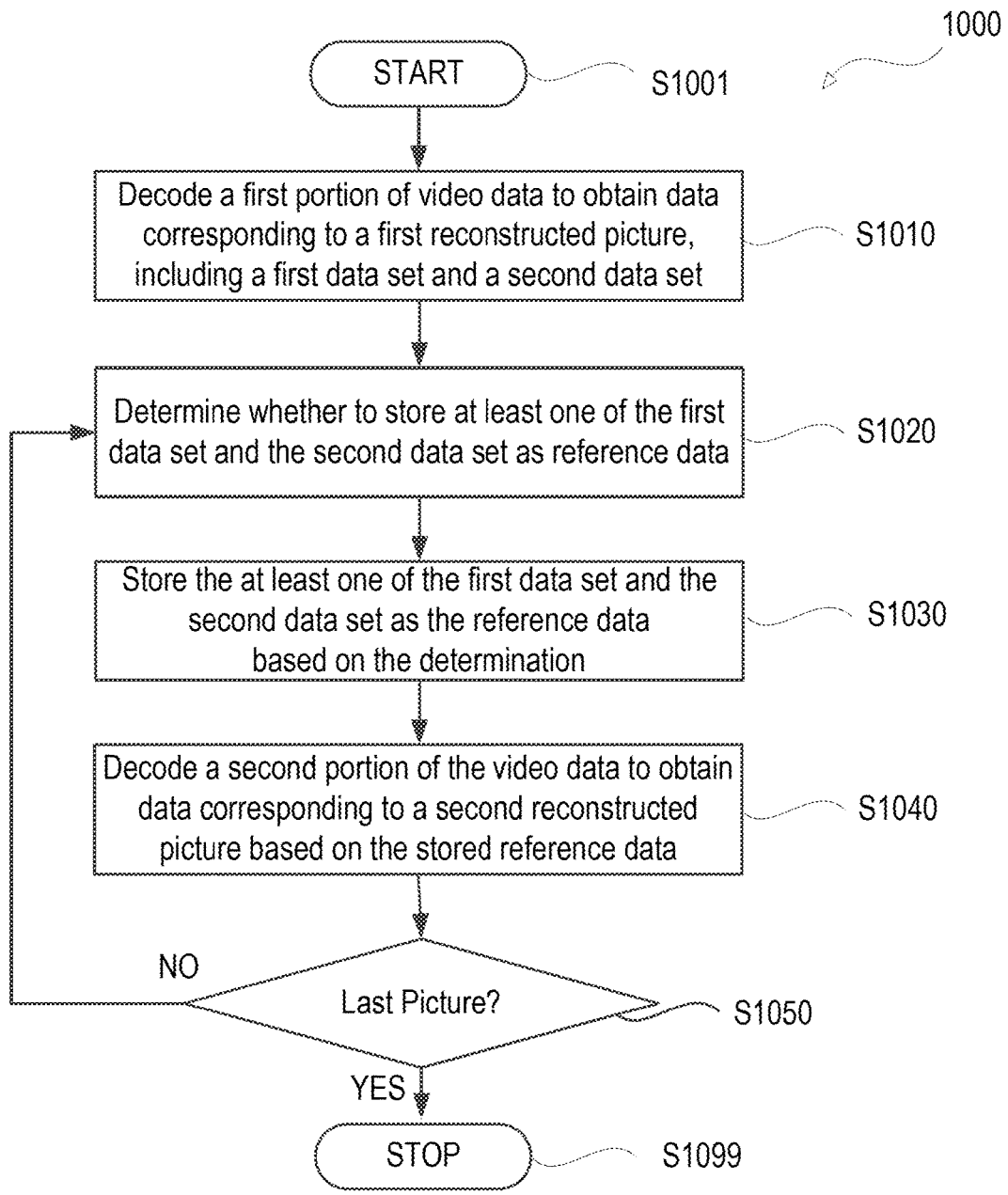
FIG. 10 shows a flow chart outlining a decoding process (1000) according to an embodiment of the disclosure.

FIG. 10 shows a flow chart outlining a decoding process (1000) according to an embodiment of the disclosure. The process (1000) can be used in decoding video data, including managing reference data for reconstructing a next picture by individually storing or discarding data sets of various information categories obtained from currently and previously reconstructed pictures. In some embodiments, one or more operations may be performed before or after process (1000), and some of the operations illustrated in FIG. 10 may be reordered or omitted.

In various embodiments, the process (1000) is executed by processing circuitry, such as the processing circuitry in the terminal devices (210), (220), (230), and (240), the processing circuitry that performs functions of the video decoder (310), (410), or (710), and the like. In at least one example, the process (1000) is applicable to managing reference data stored in a reference picture memory, such as the reference picture memory (457), during a decoding process. In some embodiments, the process (1000) is implemented in software instructions, thus when the processing circuitry executes the software instructions, the processing circuitry performs the process (1000). The process starts at (S1001) and proceeds to (S1010).

At (S1010), a first portion of video data is decoded to obtain first data of a first reconstructed picture, the first data including a first data set that corresponds to a first information category and a second data set that corresponds to a second information category. In some embodiments, the first data set and the second data set are mutually exclusive. The first information category corresponds to sample information, and the second information category corresponds to motion information, for example. In some examples, the first information category and the second information category correspond to mutually exclusive subsets selected from one or more of: sample data of various color components, motion vectors, temporal prediction directions, reference indices, intra prediction modes, block sizes, and block structures. The first portion of video data can be decoded using the system or decoders illustrated with reference to FIGS. 3, 4, and 7.

At (S1020), whether to store at least one of the first data set and the second data set of the first reconstructed picture as reference data is determined. In some embodiments, whether to store the at least one of the first data set and the second data set of the first reconstructed picture as the reference data is determined based on control information provided in the first portion of the video data. In some embodiments, whether to store the at least one of the first data set and the second data set of the first reconstructed picture as the reference data is determined based on a particular video coding standard for decoding the video data.

At (S1030), the at least one of the first data set and the second data set of the first reconstructed picture is stored as the reference data based on the determination from (S1020). In some embodiments, while storing the first data set and/or the second data set of the first reconstructed picture, previously stored data sets are removed based on control information included in the video data or based on rules defined in the particular video coding standard.

In some embodiments, in response to determining to store at least the first data set as the reference data, the first data set is stored in a first memory space configured to store data sets of a first plurality of reconstructed pictures that correspond to the first information category. In some embodiments, in response to determining to store at least the second data set as the reference data, the second data set is stored in a second memory space configured to store data sets of a second plurality of reconstructed pictures that correspond to the second information category. In some embodiments, storing and removing data sets in a reference picture memory can be managed as illustrated with reference to the examples shown in FIG. 9A and/or FIG. 9B.

In some embodiments, the first memory space is configured to store at most M data sets of M most recently reconstructed pictures that correspond to the first information category, and the second memory space is configured to store at most N data sets of N most recently reconstructed pictures that correspond to the second information category. In some examples, in response to determining to store at least the first data set as the reference data, a third data set of a third reconstructed picture that is not one of the M most recently reconstructed pictures upon obtaining the first data of the first reconstructed picture is deleted from the first memory space. In some examples, in response to determining to store at least the second data set as the reference data, a fourth data set of a fourth reconstructed picture that is not one of the N most recently reconstructed pictures upon obtaining the first data set of the first reconstructed picture is deleted from the second memory space. In some examples, M is a positive integer ranging from 1 to 10, and N is a positive integer ranging from 1 to M. In at least one example, M is set to 5 and N is set to 3.

In some embodiments, in response to determining to store at least the first data set as the reference data, whether the first memory space includes a third data set of a third reconstructed picture is determined, where a difference in a POC number of the third reconstructed picture and a POC number of the first reconstructed picture is greater than a first threshold. The third data set of the third reconstructed picture can be deleted from the first memory space in response to determining the first memory space includes the third data set. In some embodiments, in response to determining to store at least the second data set as the reference data, whether the second memory space includes a fourth data set of a fourth reconstructed picture is determined, where a difference in a POC number of the fourth reconstructed picture and the POC number of the first reconstructed picture is greater than a second threshold. The fourth data set of the fourth reconstructed picture can be deleted from the second memory space in response to determining the second memory space includes the fourth data set.

In some examples, the first threshold is a positive integer ranging from 1 to 16, and the second threshold is a positive integer ranging from 1 to the first threshold.

In some embodiments, in response to determining to store at least the first data set as the reference data, whether the first memory space includes a third data set of a third reconstructed picture is determined, where the third reconstructed picture and the first reconstructed picture are in a same temporal layer. The third data set of the third reconstructed picture can be deleted from the first memory space in response to determining the first memory space includes the third data set. In some embodiments, in response to determining to store at least the second data set as the reference data, whether the second memory space includes a fourth data set of a fourth reconstructed picture is determined, where the fourth reconstructed picture and the first reconstructed picture are in the same temporal layer. The fourth data set of the fourth reconstructed picture can be deleted from the second memory space in response to determining the second memory space includes the fourth data set.

In addition, in some embodiments, in a case that the first data set is stored in the first memory space and the second data set is stored in the second memory space, in response to an instruction to perform an operation on the stored first data set, the operation is performed on both of the stored first data set stored in the first memory space and the stored second data set stored in the second memory space. In some examples, the operation is a data deletion operation.

At (S1040), the second portion of the video data is decoded using the stored reference data to obtain second data corresponding to a second reconstructed picture. In some examples, the second portion of video data can be decoded using the system or decoders illustrated in FIGS. 3, 4, and 7.

At (S1050), in a case that the second reconstructed picture is the last picture in the video data to be decoded, the process proceeds to (S1099); and in a case that the second reconstructed picture is not the last picture in the video data to be decoded, the process proceeds to (S1020) for determining whether to store some or all of the second data as the reference data for decoding a next picture.

At (S1099), the process for decoding the video data terminates.

Figure 11:
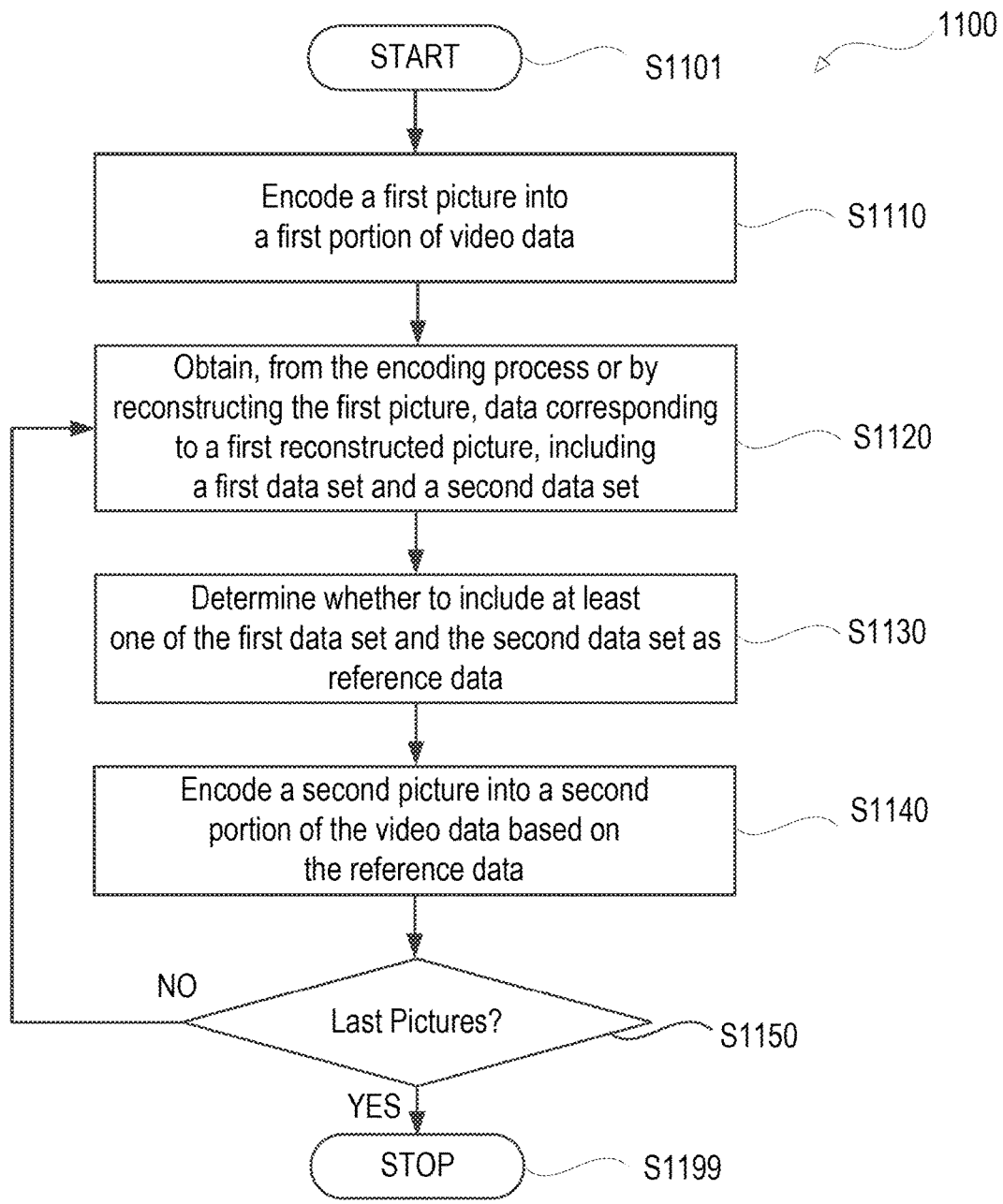
FIG. 11 shows a flow chart outlining an encoding process (1100) according to an embodiment of the disclosure.

FIG. 11 shows a flow chart outlining an encoding process (1100) according to an embodiment of the disclosure. The process (1100) can be used to encode a plurality of pictures, including managing reference data for encoding a next picture by individually storing or discarding data sets of various information categories obtained from currently and previously processed pictures. In some embodiments, one or more operations may be performed before or after process (1100), and some of the operations illustrated in FIG. 11 may be reordered or omitted.

In various embodiments, the process (1100) is executed by processing circuitry, such as the processing circuitry in the terminal devices (210), (220), (230), and (240), the processing circuitry that performs functions of the video encoder (303), (503), or (603), and the like. In at least one example, the process (1100) is applicable to managing reference data stored in a reference picture memory, such as the reference picture memory (534), during a encoding process. In some embodiments, the process (1100) is implemented in software instructions, thus when the processing circuitry executes the software instructions, the processing circuitry performs the process (1100). The process starts at (S1101) and proceeds to (S1110).

At (S1110), a first picture is encoded into a first portion of video data. In some examples, the pictures can be encoded using the system or encoders illustrated in FIGS. 3, 5, and 6.

At (S1120), first data corresponding to a reconstructed version of the first picture (e.g., a first reconstructed picture) is obtained from the encoding process at (S1110) and/or by reconstructing the first picture based on the encoded information from the encoding process at (S1110). The first data includes a first data set that corresponds to a first information category and a second data set that corresponds to a second information category. The first information category corresponds to sample information, and the second information category corresponds to motion information, for example. In some examples, the first information category and the second information category correspond to mutually exclusive subsets selected from one or more of: sample data of various color components, motion vectors, temporal prediction directions, reference indices, intra prediction modes, block sizes, and block structures.

At (S1130), whether to include at least one of the first data set and the second data set of the first reconstructed picture as reference data is determined. In some embodiments, the determination regarding whether to include the at least one of the first data set and the second data set of the first reconstructed picture as the reference data can be encoded as control information to be included in the first portion of the video data. In some embodiments, whether to include the at least one of the first data set and the second data set of the first reconstructed picture as the reference data is determined based on a particular video coding standard for encoding the video data, and therefore sending corresponding control information via the video data is not necessary.

In some embodiments, after determining whether to include at least one of the first data set and the second data set of the first reconstructed picture as the reference data, an encoder may further determine whether to remove a portion of the reference data based on a particular video coding standard for encoding the video data. In some examples, the removal of an obsolete portion of the reference data can be performed in a manner similar to the memory management mechanisms described with reference to FIG. 9A, FIG. 9B, and (S1030) in FIG. 10.

At (S1140), a second picture can be encoded as a second portion of the video data using the reference data. In some examples, the second portion of video data can be encoded using the system or encoders illustrated in FIGS. 3, 5, and 6.

At (S1150), in a case that the second picture is the last picture to be encoded into the video data, the process proceeds to (S1199); and in a case that the second picture is not yet the last picture to be encoded into the video data, the process proceeds to (S1120) for obtaining second data corresponding to a reconstructed version of the second picture (e.g., a second reconstructed picture) and determining at (S1130) whether to include some or all of the second data as the reference data for encoding a next picture.

At (S1199), the process for encoding the POC terminates.

Although FIGS. 10 and 11 are described using two information categories as an example, similar processes can be applied using three or more information categories in other embodiments. For example, the three or more information categories can be selected from one or more of: sample data of various color components, motion vectors, temporal prediction directions, reference indices, intra prediction modes, block sizes, and block structures.

The techniques described above, can be implemented as computer software using computer-readable instructions and physically stored in one or more computer-readable media. For example, FIG. 12 shows a computer system (1200) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 12:
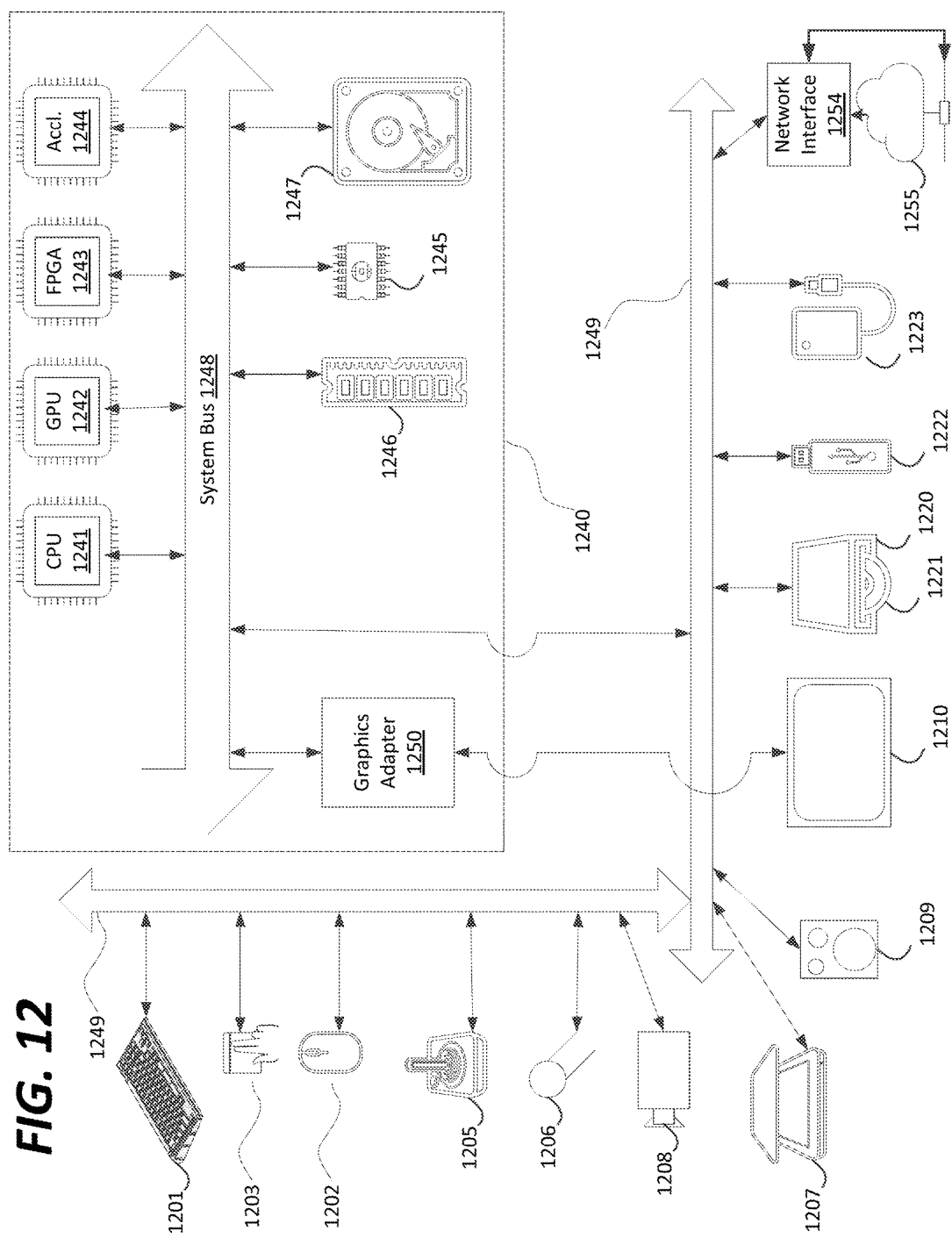
FIG. 12 is a schematic illustration of a computer system in accordance with an embodiment.

The components shown in FIG. 12 for computer system (1200) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1200).

Computer system (1200) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1201), mouse (1202), trackpad (1203), touch screen (1210), data-glove (not shown), joystick (1205), microphone (1206), scanner (1207), camera (1208).

Computer system (1200) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1210), data-glove (not shown), or joystick (1205), but there can also be tactile feedback devices that do not serve as input devices), audio output devices (such as: speakers (1209), headphones (not depicted)), visual output devices (such as screens (1210) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1200) can also include human accessible storage devices and their associated media such as optical media including CD/DVD ROM/RW (1220) with CD/DVD or the like media (1221), thumb-drive (1222), removable hard drive or solid state drive (1223), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1200) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1249) (such as, for example USB ports of the computer system (1200)); others are commonly integrated into the core of the computer system (1200) by attachment to a system bus as described below (for example Ethernet interface into a PC computer system or cellular network interface into a smartphone computer system). Using any of these networks, computer system (1200) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1240) of the computer system (1200).

The core (1240) can include one or more Central Processing Units (CPU) (1241), Graphics Processing Units (GPU) (1242), specialized programmable processing units in the form of Field Programmable Gate Areas (FPGA) (1243), hardware accelerators for certain tasks (1244), and so forth. These devices, along with Read-only memory (ROM) (1245), Random-access memory (1246), internal mass storage such as internal non-user accessible hard drives, SSDs, and the like (1247), may be connected through a system bus (1248). In some computer systems, the system bus (1248) can be accessible in the form of one or more physical plugs to enable extensions by additional CPUs, GPU, and the like. The peripheral devices can be attached either directly to the core's system bus (1248), or through a peripheral bus (1249). Architectures for a peripheral bus include PCI, USB, and the like.

CPUs (1241), GPUs (1242), FPGAs (1243), and accelerators (1244) can execute certain instructions that, in combination, can make up the aforementioned computer code. That computer code can be stored in ROM (1245) or RAM (1246). Transitional data can be also be stored in RAM (1246), whereas permanent data can be stored for example, in the internal mass storage (1247). Fast storage and retrieve to any of the memory devices can be enabled through the use of cache memory, that can be closely associated with one or more CPU (1241), GPU (1242), mass storage (1247), ROM (1245), RAM (1246), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1200), and specifically the core (1240) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1240) that are of non-transitory nature, such as core-internal mass storage (1247) or ROM (1245). The software implementing various embodiments of the present disclosure can be stored in such devices and executed by core (1240). A computer-readable medium can include one or more memory devices or chips, according to particular needs. The software can cause the core (1240) and specifically the processors therein (including CPU, GPU, FPGA, and the like) to execute particular processes or particular parts of particular processes described herein, including defining data structures stored in RAM (1246) and modifying such data structures according to the processes defined by the software. In addition or as an alternative, the computer system can provide functionality as a result of logic hard-wired or otherwise embodied in a circuit (for example: accelerator (1244)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding in a decoder, comprising:
    decoding a first portion of video data to obtain first data of a first reconstructed picture, the first data including a first data set that corresponds to a first information category and a second data set that corresponds to a second information category, the first data set and the second data set being mutually exclusive;
    determining whether to selectively store at least one of the first data set and the second data set of the first reconstructed picture as reference data;
    storing the at least one of the first data set and the second data set of the first reconstructed picture as the reference data based on the determination, including in response to determining to store at least the first data set as the reference data, storing the first data set in a first memory space configured to store data sets of a first plurality of reconstructed pictures that correspond to the first information category, and in response to determining to store at least the second data set as the reference data, storing the second data set in a second memory space configured to store data sets of a second plurality of reconstructed pictures that correspond to the second information category; and decoding a second portion of the video data to obtain second data of a second reconstructed picture based on the stored reference data.

2. The method of claim 1, wherein the determining whether to store the at least one of the first data set and the second data set of the first reconstructed picture as the reference data is based on control information provided in the first portion of the video data.

3. The method of claim 1, further comprising:
in a case that the first data set is stored in the first memory space and the second data set is stored in the second memory space, in response to an instruction to perform an operation on the stored first data set, performing the operation on both of the stored first data set stored and the stored second data set.

4. The method of claim 3, wherein
the operation is a data deletion operation.

5. The method of claim 1, wherein
the first memory space is configured to store at most M data sets of M most recently reconstructed pictures that correspond to the first information category,
the second memory space is configured to store at most N data sets of N most recently reconstructed pictures that correspond to the second information category, and
the method further comprises:
in response to determining to store at least the first data set as the reference data, deleting from the first memory space a third data set of a third reconstructed picture that is not one of the M most recently reconstructed pictures upon obtaining the first data of the first reconstructed picture; and
in response to determining to store at least the second data set as the reference data, deleting from the second memory space a fourth data set of a fourth reconstructed picture that is not one of the N most recently reconstructed pictures upon obtaining the first data of the first reconstructed picture.

6. The method of claim 5, wherein
M ranges from 1 to 10, and
N ranges from 1 to M.

7. The method of claim 1, further comprising:
in response to determining to store at least the first data set as the reference data,
determining whether the first memory space includes a third data set of a third reconstructed picture, a difference in a Picture Order Count (POC) number of the third reconstructed picture and a POC number of the first reconstructed picture being greater than a first threshold, and
deleting from the first memory space the third data set of the third reconstructed picture in response to determining the first memory space includes the third data set; and
in response to determining to store at least the second data set as the reference data, determining whether the second memory space includes a fourth data set of a fourth reconstructed picture, a difference in a POC number of the fourth reconstructed picture and the POC number of the first reconstructed picture being greater than a second threshold, and
deleting from the second memory space the fourth data set of the fourth reconstructed picture in response to determining the second memory space includes the fourth data set.

8. The method of claim 1, further comprising:
in response to determining to store at least the first data set as the reference data,
determining whether the first memory space includes a third data set of a third reconstructed picture, the third reconstructed picture and the first reconstructed picture being in a same temporal layer, and
deleting from the first memory space the third data set of the third reconstructed picture in response to determining the first memory space includes the third data set; and
in response to determining to store at least the second data set as the reference data,
determining whether the second memory space includes a fourth data set of a fourth reconstructed picture, the fourth reconstructed picture and the first reconstructed picture being in the same temporal layer, and
deleting from the second memory space the fourth data set of the fourth reconstructed picture in response to determining the second memory space includes the fourth data set.

9. The method of claim 1, wherein
the first information category corresponds to sample information, and
the second information category corresponds to motion information.

10. The method of claim 1, wherein the first information category and the second information category correspond to mutually exclusive subsets selected from one or more of: sample data of various color components, motion vectors, temporal prediction directions, reference indices, intra prediction modes, block sizes, and block structures.

11. An apparatus, comprising:
processing circuitry configured to:
decode a first portion of video data to obtain first data of a first reconstructed picture, the first data including a first data set that corresponds to a first information category and a second data set that corresponds to a second information category, the first data set and the second data set being mutually exclusive;
determine whether to selectively store at least one of the first data set and the second data set of the first reconstructed picture as reference data;
store the at least one of the first data set and the second data set of the first reconstructed picture as the reference data based on the determination, including
in response to determining to store at least the first data set as the reference data, storing the first data set in a first memory space configured to store data sets of a first plurality of reconstructed pictures that correspond to the first information category, and
in response to determining to store at least the second data set as the reference data, storing the second data set in a second memory space configured to store data sets of a second plurality of reconstructed pictures that correspond to the second information category; and decode a second portion of the video data to obtain second data of a second reconstructed picture based on the stored reference data.

12. The apparatus of claim 11, wherein the processing circuitry is configured to:

determine whether to store the at least one of the first data set and the second data set of the first reconstructed picture as the reference data based on control information provided in the first portion of the video data.

13. The apparatus of claim 11, wherein the first memory space is configured to store at most M data sets of M most recently reconstructed pictures that correspond to the first information category, the second memory space is configured to store at most N data sets of N most recently reconstructed pictures that correspond to the second information category, and the processing circuitry is configured to:

in response to determining to store at least the first data set as the reference data, delete from the first memory space a third data set of a third reconstructed picture that is not one of the M most recently reconstructed pictures upon obtaining the first data of the first reconstructed picture; and in response to determining to store at least the second data set as the reference data, delete from the second memory space a fourth data set of a fourth reconstructed picture that is not one of the N most recently reconstructed pictures upon obtaining the first data of the first reconstructed picture.

14. The apparatus of claim 11, wherein processing circuitry is configured to:

in response to determining to store at least the first data set as the reference data, determine whether the first memory space includes a third data set of a third reconstructed picture, a difference in a Picture Order Count (POC) number of the third reconstructed picture and a POC number of the first reconstructed picture being greater than a first threshold, and delete from the first memory space the third data set of the third reconstructed picture in response to determining the first memory space includes the third data set; and in response to determining to store at least the second data set as the reference data, determine whether the second memory space includes a fourth data set of a fourth reconstructed picture, a difference in a POC number of the fourth reconstructed picture and the POC number of the first reconstructed picture being greater than a second threshold, and delete from the second memory space the fourth data set of the fourth reconstructed picture in response to determining the second memory space includes the fourth data set.

15. The apparatus of claim 11, wherein processing circuitry is configured to:

in response to determining to store at least the first data set as the reference data, determine whether the first memory space includes a third data set of a third reconstructed picture, the third reconstructed picture and the first reconstructed picture being in a same temporal layer, and delete from the first memory space the third data set of the third reconstructed picture in response to determining the first memory space includes the third data set; and in response to determining to store at least the second data set as the reference data, determine whether the second memory space includes a fourth data set of a fourth reconstructed picture, the fourth reconstructed picture and the first reconstructed picture being in the same temporal layer, and delete from the second memory space the fourth data set of the fourth reconstructed picture in response to determining the second memory space includes the fourth data set.

16. A non-transitory computer-readable medium storing instructions which when executed by a computer for video decoding causes the computer to perform:

decoding a first portion of video data to obtain first data of a first reconstructed picture, the first data including a first data set that corresponds to a first information category and a second data set that corresponds to a second information category, the first data set and the second data set being mutually exclusive;

determining whether to selectively store at least one of the first data set and the second data set of the first reconstructed picture as reference data;

storing the at least one of the first data set and the second data set of the first reconstructed picture as the reference data based on the determination, including in response to determining to store at least the first data set as the reference data, storing the first data set in a first memory space configured to store data sets of a first plurality of reconstructed pictures that correspond to the first information category, and in response to determining to store at least the second data set as the reference data, storing the second data set in a second memory space configured to store data sets of a second plurality of reconstructed pictures that correspond to the second information category; and decoding a second portion of the video data to obtain second data of a second reconstructed picture based on the stored reference data.

17. The non-transitory computer-readable medium of claim 16, wherein the first memory space is configured to store at most M data sets of M most recently reconstructed pictures that correspond to the first information category, the second memory space is configured to store at most N data sets of N most recently reconstructed pictures that correspond to the second information category, and the stored instructions which when executed by the computer for video decoding causes the computer to perform:

in response to determining to store at least the first data set as the reference data, deleting from the first memory space a third data set of a third reconstructed picture that is not one of the M most recently reconstructed pictures upon obtaining the first data of the first reconstructed picture; and in response to determining to store at least the second data set as the reference data, deleting from the second memory space a fourth data set of a fourth reconstructed picture that is not one of the N most recently reconstructed pictures upon obtaining the first data of the first reconstructed picture.

18. The non-transitory computer-readable medium of claim 16, wherein the stored instructions which when executed by the computer for video decoding causes the computer to perform:

in response to determining to store at least the first data set as the reference data,
- determining whether the first memory space includes a third data set of a third reconstructed picture, a difference in a Picture Order Count (POC) number of the third reconstructed picture and a POC number of the first reconstructed picture being greater than a first threshold, and
- deleting from the first memory space the third data set of the third reconstructed picture in response to determining the first memory space includes the third data set; and in response to determining to store at least the second data set as the reference data,
- determining whether the second memory space includes a fourth data set of a fourth reconstructed picture, a difference in a POC number of the fourth reconstructed picture and the POC number of the first reconstructed picture being greater than a second threshold, and
- deleting from the second memory space the fourth data set of the fourth reconstructed picture in response to determining the second memory space includes the fourth data set.

19. The non-transitory computer-readable medium of claim 16, wherein the stored instructions which when executed by the computer for video decoding causes the computer to perform:

in response to determining to store at least the first data set as the reference data,
- determining whether the first memory space includes a third data set of a third reconstructed picture, the third reconstructed picture and the first reconstructed picture being in a same temporal layer, and
- deleting from the first memory space the third data set of the third reconstructed picture in response to determining the first memory space includes the third data set; and in response to determining to store at least the second data set as the reference data,
- determining whether the second memory space includes a fourth data set of a fourth reconstructed picture, the fourth reconstructed picture and the first reconstructed picture being in the same temporal layer, and
- deleting from the second memory space the fourth data set of the fourth reconstructed picture in response to determining the second memory space includes the fourth data set.

20. The apparatus of claim 11, wherein the first information category and the second information category correspond to mutually exclusive subsets selected from one or more of: sample data of various color components, motion vectors, temporal prediction directions, reference indices, intra prediction modes, block sizes, and block structures.

* * * * *